United States Patent [19]

Anway et al.

[11] Patent Number: 4,518,558
[45] Date of Patent: May 21, 1985

[54] PARISON STRETCHER

[75] Inventors: Kenneth L. Anway; Gerald W. Born, both of Mentor, Ohio

[73] Assignee: Quality Products, Inc., Eldora, Iowa

[21] Appl. No.: 472,580

[22] Filed: Mar. 7, 1983

[51] Int. Cl.³ .......................... B29C 17/07; B29D 3/00
[52] U.S. Cl. ..................................... 264/515; 264/516; 264/531; 264/533; 264/534; 264/541; 425/525; 425/532
[58] Field of Search ............... 264/516, 531, 533, 534, 264/541, 515; 425/525, 532

[56] References Cited

U.S. PATENT DOCUMENTS

| | | | |
|---|---|---|---|
| 3,100,317 | 8/1963 | Perry | 264/531 |
| 3,275,726 | 9/1966 | Rudolph | 264/516 X |
| 3,371,376 | 3/1968 | Fischer et al. | 264/533 X |
| 3,452,391 | 7/1969 | Langecker | 264/531 X |
| 4,092,392 | 5/1978 | Dunbeker | 264/531 X |
| 4,334,852 | 6/1982 | Haubert | 264/531 X |

FOREIGN PATENT DOCUMENTS 52-23648  6/1977  Japan .................................. 425/525

Primary Examiner—Jan Silbaugh
Attorney, Agent, or Firm—Kane, Dalsimer, Kane, Sullivan and Kurucz

[57] ABSTRACT

A method and apparatus for producing hollow plastic articles are disclosed. The articles have a blow-molded portion and a compression-molded portion, and are formed by downwardly extruding plastic at at least one extrusion rate to progressively form a parison having a downwardly facing open end from a first location adjacent an extrusion head toward a second location axially spaced therefrom. A male mold member is provided at the second location. Portions of the open end of the parison are engaged by a plurality of fingers, while the open end travels toward the second location and the engaged portions are moved downwardly at a rate at least corresponding to the extrusion rate. During the travel toward the second location, portions of the open end are radially expanded and guided over the male mold member. The parison is enclosed in a hollow mold having a molding surface corresponding to the blow-molded portion of the hollow article and having a second portion having a molding surface corresponding to the compression molded portion of the hollow article and cooperating with the male mold member. Air is admitted to the interior of the first portion to form the blow-molded portion.

6 Claims, 6 Drawing Figures

PARISON STRETCHER

BACKGROUND OF THE INVENTION

This invention relates to plastic molding methods and apparatus and, more particularly, to methods and apparatus for forming one-piece, hollow plastic articles having a blow-molded portion and a compression molded portion. In the art of blow molding hollow plastic articles, a tubular parison is extruded from an extrusion head in a semi-soft condition and at an elevated molding temperature. The parison is formed in the path of a closable blow mold which usually comprises a pair of mold halves having an inner surface which conforms to the desired outer surface configuration of the article to be molded. The mold halves are closed on the parison to form an access opening around a blowing pin at one end of the mold and to pinch off and seal the parison at the other end of the mold. Air is admitted to the interior of the parison through the blowing pin, to expand the parison against the mold surface and the mold conducts heat from the molded article to cause the plastic to form a solid molded object. The mold halves are then separated and the article is removed from the molding apparatus.

Many blow-molded containers have a reduced diameter threaded neck which is molded around the mold blow pin and held by the mold while the parison is blown to conform to the remainder of the container. In blow molding containers having relatively wide mouth access openings, certain manufacturing dilemmas are presented. If a relatively large diameter parison is selected to mold a container having a wide mouth opening, relatively little radial expansion of the parison is accomplished and folds and imperfect definitions obtain on the outer surface of the molded article. Moreover, a large pinch-off or tear line occurs across the closed end of the container. If, on the other hand, a small diameter parison is used for a container having a relatively wide access opening, the parison cannot mold itself to the wide mouth aperture without leaving an annular cap at the opening which must be later machined.

A solution to the foregoing problem is offered in U.S. Pat. No. 3,371,376, wherein a container having a large mouth opening is blow-molded. The parison has a relatively small diameter compared to the diameter of the container and the neck opening to be molded. The patentees provide an expanding device which includes a plurality of fingers designed to move radially apart in a horizontal plane after receiving the parison to stretch the open mouth of the parison to conform to the wide open mouth of the container. During the expanding operation, however, the mold segments are closed on the parison and air must be blown into the parison to support the parison prior to sealing the mold. This technique, however, not only results in an uncontrolled manipulation of the parison but requires a considerable amount of excess compressed air in the molding operation, and therefore increased production costs.

A particularly difficult blow molding operation is involved in blow-molding a container having an integral funnel associated therewith. In U.S. Pat. No. 3,278,666, a technique for blow molding such a container is disclosed. Since the funnel portion of the container is blow-molded with the reservoir portion of the container, and since those portions are joined by a relatively narrow blow-molded neck, considerable flash remains on the molded product, depending upon the diameter of the extruded parison. In fact, the patentee finds it necessary to provide corrugations in the flash to conpensate for shrinkage of the scrap trim portions after the blow molding operation.

SUMMARY OF THE INVENTION

This invention overcomes many of the prior art problems associated with the blow molding of hollow objects having relatively wide openings therein wherein the molding operation includes a compression molding operation.

According to this invention, hollow plastic articles are produced by the steps of downwardly extruding a tubular plastic parison at a predetermined extrusion rate. During the downward travel of the tubular parison, portions of the open mouth of the parison are grasped, expanded, and guided over a stationary male mold member positioned in axial alignment with the parison extrusion head and in a position to cooperate with a portion of a hollow mold to define a compression molding surface. The hollow mold has the aforementioned compression molding surface and has a blow molding surface which, when sections of the hollow mold are translated toward the axis of the parison, will define a blow-molded portion and a compression-molded portion upon the admission of air to the blow molding portion of the mold.

The techniques of the invention are particularly adapted to produce integral funnel-shaped openings for hollow containers. However, it will be appreciated that the teachings of the invention are also adapted to produce hollow containers having a wide variety of access openings.

A further aspect of the invention is to produce a hollow plastic article by a combination of blow molding and compression molding techniques which provide female threads in the opening adapted to cooperate with a threaded male closure member.

DETAILED DESCRIPTION OF THE INVENTION

Figure 1:
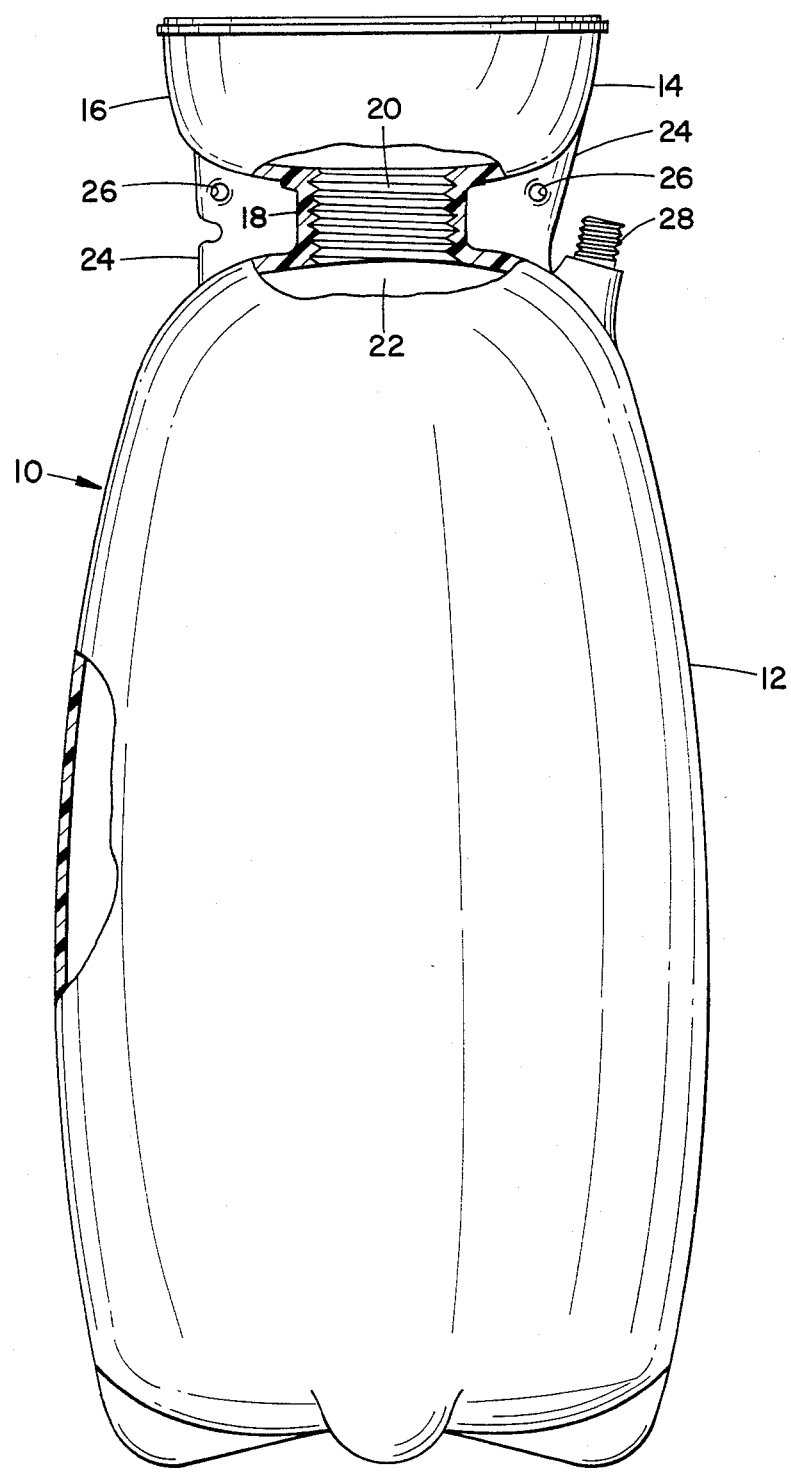
FIG. 1 is an elevational view of a hollow plastic article, with portions broken away for clarity, produced in accordance with the teachings of this invention.
Figure 2:
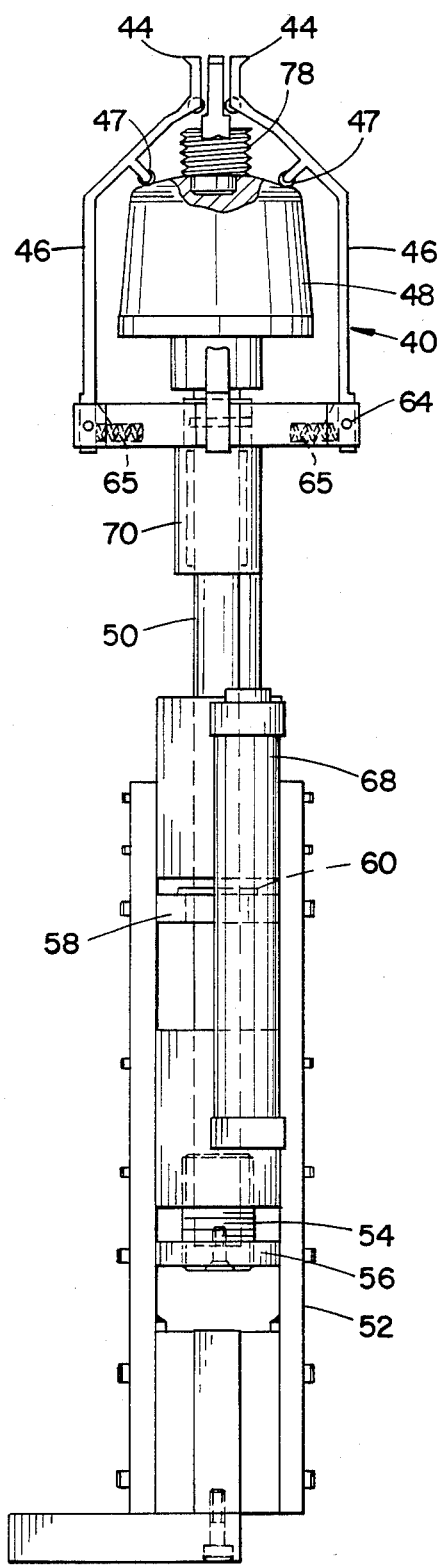
FIG. 2 is an elevational view, partly in section, of a parison stretching device according to this invention, illustrating the stretching device in a parison receiving condition.
Figure 3:
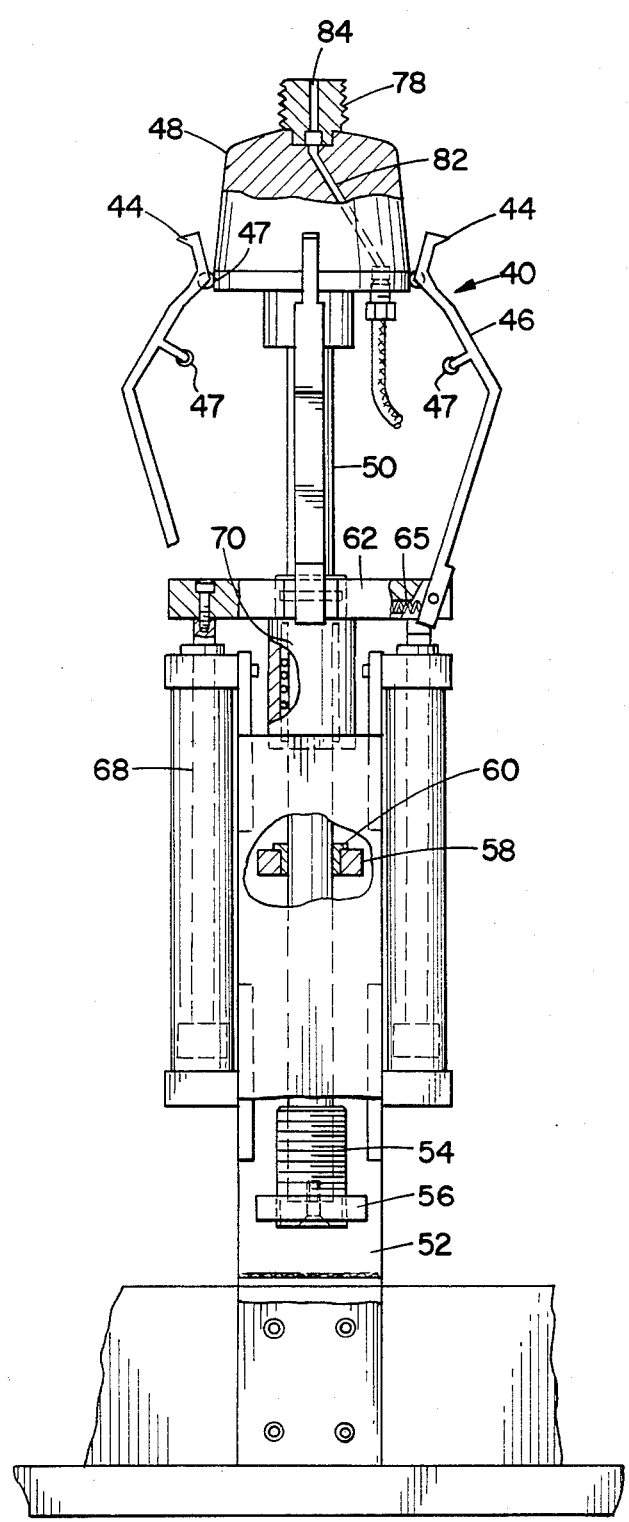
FIG. 3 is an elevational view, partly in section, with portions broken away for clarity, of a parison stretching device showing the device in a parison stretching position.

Referring now to the drawings, and initially to FIG. 1, there is illustrated a hollow molded article 10 which is produced in accordance with the teachings of this invention. The article 10 is a hollow molded tank having a blow-molded portion 12 and a compression-molded portion 14. Included in the compression-molded portion 14 are a funnel 16 and a neck 18 having internal threads 20 which connect the funnel 16 to the interior 22 of the blow-molded portion 12. Webs 24 add support between the funnel 16 and the portion 12, and include apertures 26 which may receive a carrying strap (not shown). The article illustrated in FIG. 1 is suitable as a pressure sprayer container for home and garden use, and the threads 20 may receive a closure which supports the hand pump component of the sprayer. Molded into the portion 12 is a threaded dispensing spout 28 to which a sprayer wand (not shown) may be attached.

Referring now to FIGS. 2 through 6, the molded article 10 may be produced by an apparatus which includes a conventional parison extrusion head 30, a segmented hollow mold 32 which, in the illlustrated embodiment, includes a pair of mold halves 34 and 36 having an inside surface 38 which defines the outside surface of the article 10 to be molded, and a parison stretching and compression molding assembly 40.

Figure 4:
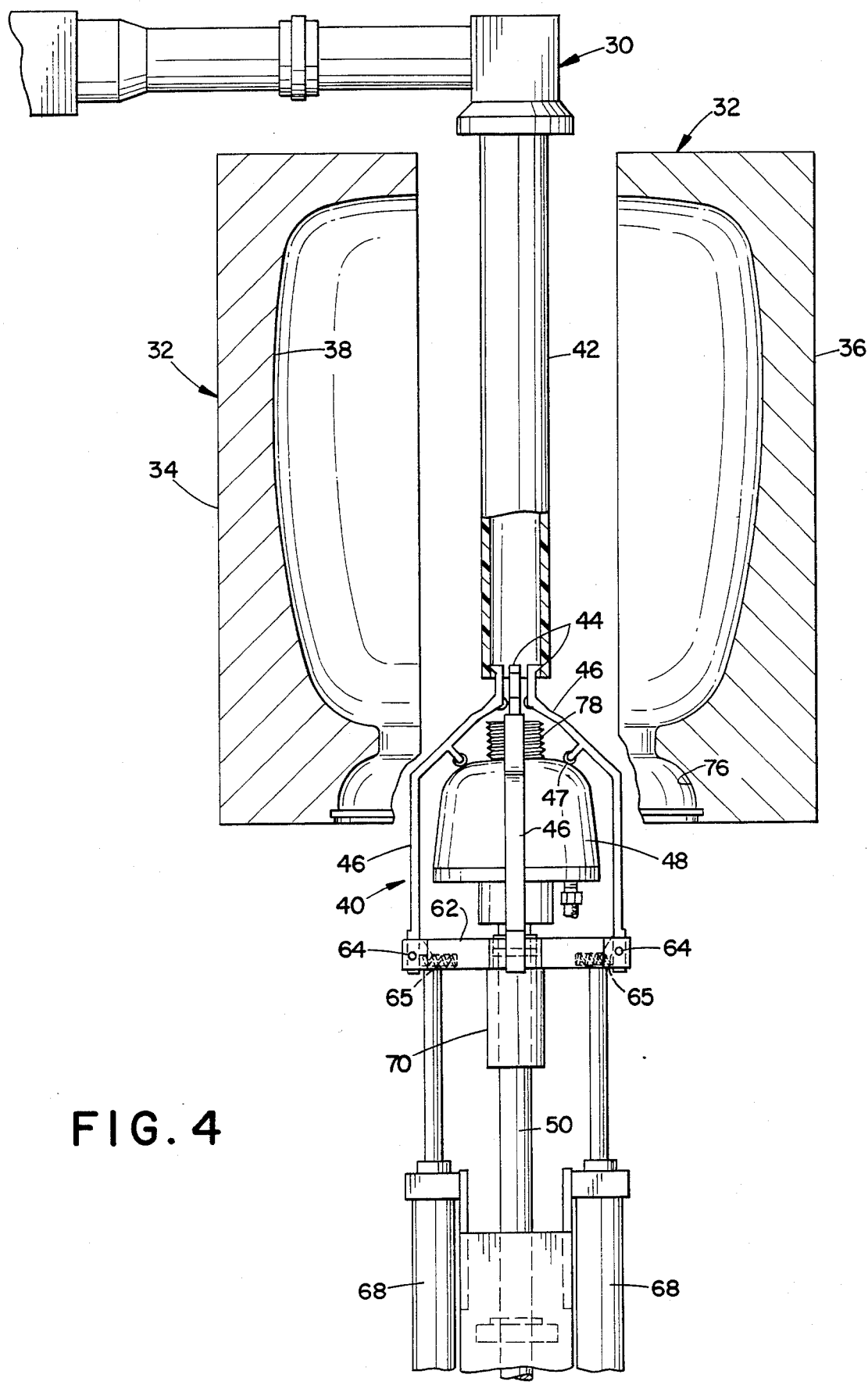
FIG. 4 is an elevational view, partly in section, of the apparatus according to this invention, showing the molding apparatus in a parison receiving position.
Figure 5:
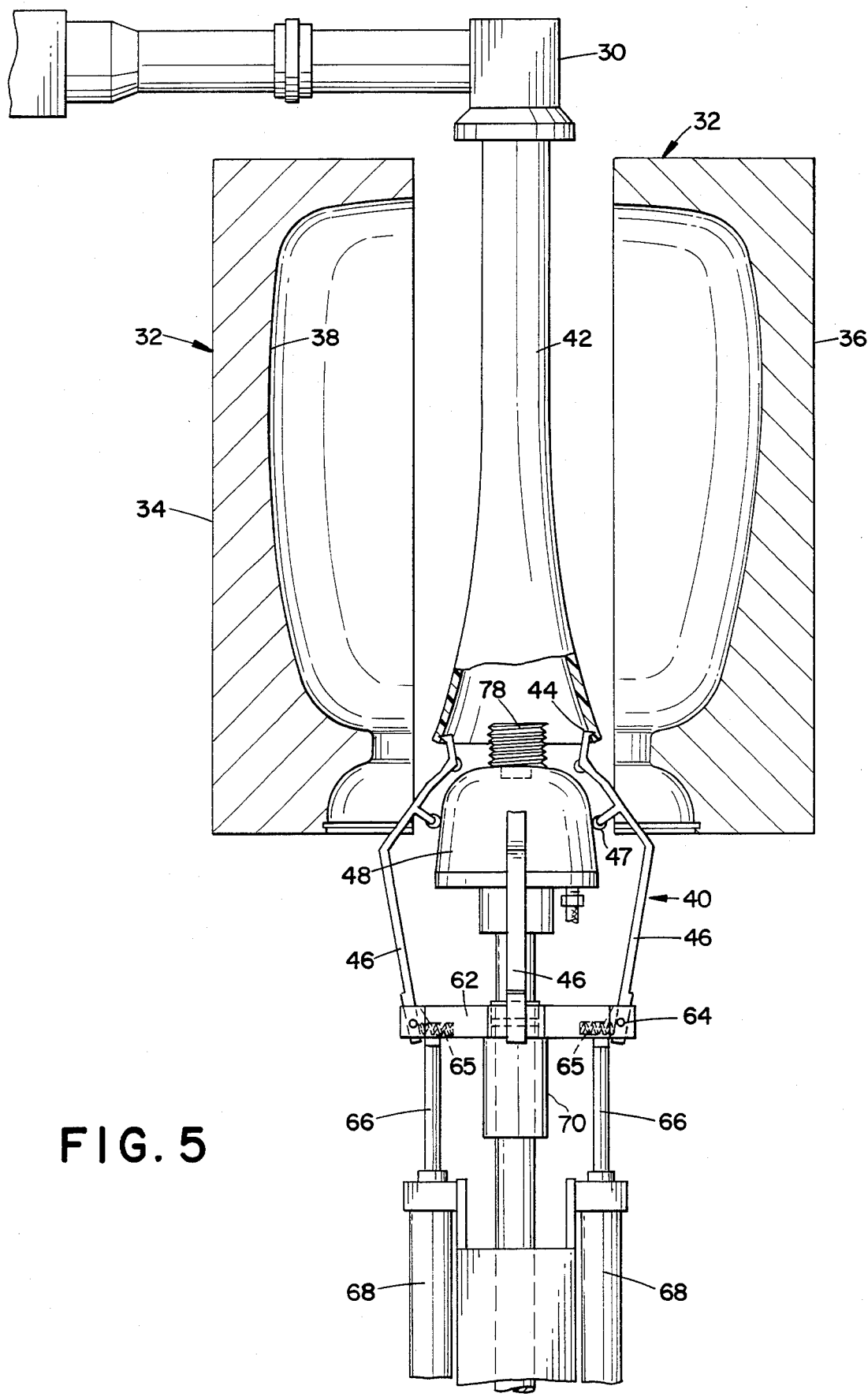
FIG. 5 is a view similar to FIG. 4, but showing the apparatus in an intermediate state in the molding operation.

A tube or parison 42 is extruded downwardly by the extrusion head 30 and is in a flowable plastic state in the condition illustrated in FIGS. 4 and 5. The extrusion rate is inversely proportional to the extruded wall thickness of the parison so that a fast extrusion rate produces a relatively thin wall and a slow rate produces a relatively thick wall. For reasons which will become apparent, the parison drop time is about 34 to 35 seconds at varying extrusion rates. A varying extrusion rate is necessary to provide varying thicknesses in the wall of the parison so that the thicker parison portions will provide sufficient material for those portions of the parison which are to be subjected to greater radial expansions and for those portions of the parison which are to be subjected to the compression molding aspects of this invention. The extrusion rates are selected to provide a relatively thick section for forming the portion 14, a relatively thin section for forming the portion 12, and a relatively thick portion to accommodate pinch-off at the bottom of the article. The downward travel of the parison 42 is between the open mold halves 34 and 36 and toward the assembly 40.

When the parison reaches the position illustrated in FIG. 4 of the drawings, it has just encircled a plurality of outwardly directed finger portions 44 which are provided on a plurality of profile follower arms 46. As will become apparent, the follower arms 46 are caused to move axially downwardly and radially outwardly, with the downward component of the movement being at a rate which is at least equal to the rate of travel of the parison from its position illustrated in FIG. 4 to the position illustrated in FIG. 6.

Figure 6:
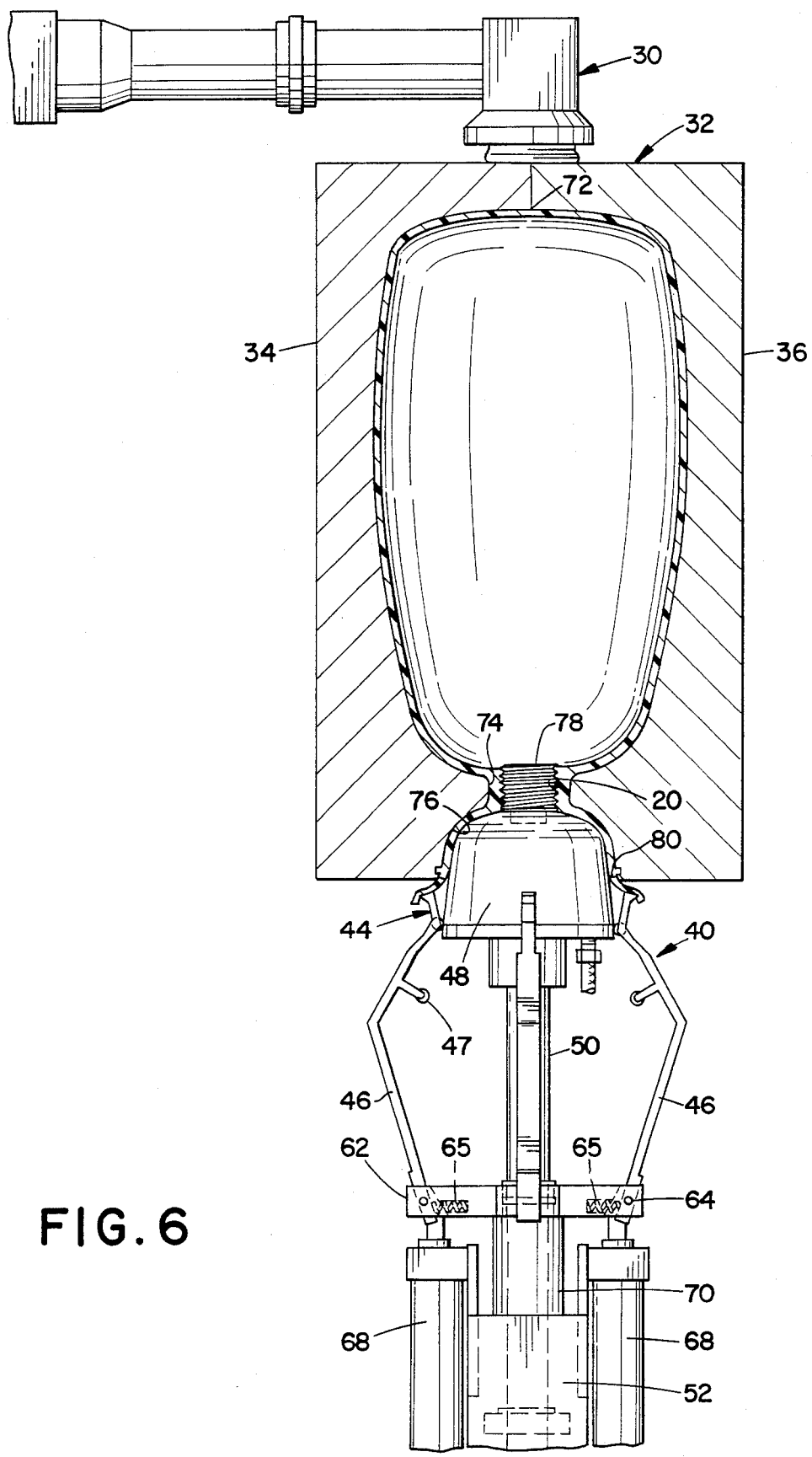
FIG. 6 is an illustration similar to FIGS. 4 and 5 but showing the molding apparatus in a final molding position.

During the travel from the position illustrated in FIG. 4 to the position illustrated in FIG. 6, the end or mouth of the parison 42 is guided downwardly by the fingers 44 and is stretched radially outwardly to envelop a male mold member 48. The male mold member 48 is mounted on a rod 50 which is adjustably fixed within a stationary frame 52. To this end, the rod 50 is provided with an adjusting sleeve 54 at its lower end, which is threaded into a nut 56 fixed to the frame 52. By this arrangement, the position of the male mold member 48 may be correctly adjusted with respect to the position of the mold segments 34 and 36. The rod 50 is further supported in a fixed rod support 58 having a bushing 60 therein.

The profile follower arms 46 are pivotally connected to a carrier plate 62 by pivot pins 64 and are biased radially inwardly by a die compression spring 65. The plate 62 is driven downwardly by pistons 66 at preselected rates by double-acting cylinders 68. The cylinders 68 are fixed to the frame 52 and the plate 62 carries a bearing sleeve 70 so that the plate 62 is guided relative to the rod 50 which extends through the plate 62. Downward movement of the plate 62 causes the follower arms 46 to spread as roller followers 47 on the arms 46 ride on the surface of the male mold member 48.

When the parison has completed its travel to envelop the male mold member 48, the mold segments 34 and 36 are moved radially inwardly to the position illustrated in FIG. 6. The mold surface 38 surrounds a major portion of the parison and pinches off the top of the parison at a location 72, and a neck molding portion 74 and a funnel molding portion 76 of the mold segments 34 and 36 compression-mold the parison against a threaded insert 78 and against the male mold member 48, respectively. What will become the funnel mouth in the molded product is pinched off at a location 80 by the mold segments 34 and 36.

When the mold segments are brought together to the position illustrated in FIG. 6, air is admitted to the parison through a passageway 82 (FIG. 3) in the male mold member and through a passageway 84 in the threaded insert 78. The parison is thereby expanded until it conforms to the mold surface 38. After a suitable cooling period, which is promoted by the natural heat sink of the mold segments 34 and 36 and is typically about 170 seconds, the mold segments 34 and 36 are opened. When the molded object is released by the segments 34 and 36, the follower arms 46 are driven upwardly by the carrier plate 62 so that the fingers 44 are returned to the start position illustrated in FIG. 4. This operation serves to lift the molded article from the male mold member 48.

Since the threaded insert 78 is loosely mounted on the male mold member and is not attached thereto, the threaded insert 78 is molded into and carried by the molded tank. After a suitable post-curing period, which is typically no longer than it takes to remove the finished article from the blow molding work station, the threaded insert 78 is unscrewed from the opening and placed in its position on the male mold member 48 for a further molding operation. By permitting the thermoplastic to cool prior to the removal of the insert 78, thread uniformity is ensured in the molded article.

Although the preferred embodiment of this invention has been shown and described, it should be understood that various modifications and rearrangements of the parts may be resorted to without departing from the scope of the invention as disclosed and claimed herein.

What is claimed is:

1. A method for producing hollow plastic articles having a relatively wide body, a narrow neck and a relatively wide funnel shaped mouth comprising the steps of downwardly extruding plastic at at least one predetermined extrusion rate to progressively form a parison having a downwardly facing open end from a first location adjacent an extrusion head toward a second location axially spaced therefrom, said parison having a diameter smaller than the diameter of said wide mouth, providing a male mold member having an outer surface corresponding to said wide mouth at said second location, engaging portions of the open end of the parison while said open end travels toward said second location, and moving the engaged portions downwardly at a rate at least corresponding to said extrusion rate, during said travel toward said second location, radially expanding the engaged portions of said open end to guide it along said outer surface over said male mold member, enclosing said parison in a hollow mold having a first portion having a molding surface corresponding to the blow-molded portion of said hollow article, and having a second portion having a molding surface corresponding to the narrow neck and wide mouth of said hollow article and cooperating with said male mold member, admitting air to the interior of the first portion of said hollow mold to form said wide body by blow molding while forming the neck and wide mouth by compression molding by the cooperation between the second portion of the mold and the male member.

2. A method according to claim 1, including the step of providing a threaded insert on the male mold member, compression-molding the parison around said threaded insert, and removing the threaded insert from the male mold member with the molded article.

3. A method for producing hollow plastic articles according to claim 2, including the step of removing the threaded insert from the plastic article and replacing said insert on the male mold member.

4. A method for producing hollow plastic articles according to claim 1, wherein the predetermined extrusion rate is sequentially varied.

5. A method for producing hollow plastic articles according to claim 4, wherein said extrusion rate is sequentially varied to produce a parison having a varied wall thickness to provide sufficient extruded plastic material for those portions of the parison which are to be subjected to greater radial expansions and for those portions of the parison which are to be subjected to compression molding.

6. Apparatus for producing hollow plastic articles having a relative wide body, a narrow neck and a relatively wide funnel shaped mouth comprising: extrusion head means for extruding a tubular thermoplastic parison having a downwardly facing open end and at least one predetermined extrusion rate, said parison having a diameter smaller than the diameter of said wide mouth, segmented mold means comprising a plurality of cooperating mold members having first and second inner surface portions respectively defining the body, neck and mouth of the article to be molded, means for radially translating said segmented mold means toward said tubular parison to a position forming a continuous mold surface, means defining a male mold member beneath and in axial alignment with said extrusion head means, said male mold member having an outer surface cooperating with the second surface portions of said mold means to form the neck and mouth of said article by compression molding, stretching means having finger means for engaging portions of the open end of the parison while said parison is being extruded at a predetermined rate, means for radially expanding said finger means outwardly and for moving said finger means downwardly at a rate at least corresponding to said predetermined rate for stretching said parison over said male mold, by-cam following said male member outer surface and passage means to the interior of said mold for conducting air for blow molding said body.

* * * * *